United States Patent
Roosta et al.

(10) Patent No.: US 9,137,139 B2
(45) Date of Patent: Sep. 15, 2015

(54) SENDER-SPECIFIC COUNTER-BASED ANTI-REPLAY FOR MULTICAST TRAFFIC

(75) Inventors: Tanya Roosta, Saratoga, CA (US); Kavitha Kamarthy, Milpitas, CA (US); Dinesh Ranjit, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1087 days.

(21) Appl. No.: 12/641,405

(22) Filed: Dec. 18, 2009

(65) Prior Publication Data

US 2011/0153862 A1    Jun. 23, 2011

(51) Int. Cl.
*G06F 15/16* (2006.01)
*H04L 12/28* (2006.01)
*H04L 12/701* (2013.01)
*H04L 29/06* (2006.01)

(52) U.S. Cl.
CPC ............ *H04L 45/00* (2013.01); *H04L 63/1441* (2013.01); *H04L 65/102* (2013.01); *H04L 63/0428* (2013.01)

(58) Field of Classification Search
CPC . H04L 63/1441; H04L 64/0428; H04I 65/102
USPC .......................................................... 709/234
See application file for complete search history.

(56) References Cited

U.S. PATENT DOCUMENTS

| | | | |
|---|---|---|---|
| 7,853,691 B2 * | 12/2010 | Elzur et al. | 709/225 |
| 2004/0008711 A1 * | 1/2004 | Lahti et al. | 370/428 |
| 2007/0083923 A1 | 4/2007 | Fluhrer et al. | |
| 2008/0155677 A1 * | 6/2008 | Hossain et al. | 726/15 |
| 2008/0260158 A1 * | 10/2008 | Chin et al. | 380/277 |
| 2010/0165839 A1 * | 7/2010 | Senese et al. | 370/232 |
| 2010/0169645 A1 * | 7/2010 | McGrew et al. | 713/170 |
| 2010/0265949 A1 * | 10/2010 | Cervantes | 370/392 |
| 2010/0268935 A1 * | 10/2010 | Rodgers et al. | 713/153 |
| 2011/0134930 A1 * | 6/2011 | McLaren et al. | 370/401 |

OTHER PUBLICATIONS

M.G. Gouda et al., "Anti-Replay Window Protocols for Secure IP," Computer Communications and Networks, 2000, Ninth International Conference, Las Vegas, Nevada, Oct. 16-18, 2000.

\* cited by examiner

*Primary Examiner* — Viet Vu
*Assistant Examiner* — Herman Belcher
(74) *Attorney, Agent, or Firm* — Edell, Shapiro & Finnan, LLC (57) ABSTRACT

A network device receives packets sent over a network from another network device. Each packet contains a source identifier that identifies a device that is the source of the packet, a destination identifier that identifies a device that is the intended destination of the packet, a sender identifier that identifies a network device that encrypted and sent the packet and a sequence number associated with the packet. The network device stores data indicating source identifier, destination identifier, sender identifier and sequence number for packets received over time. The network device rejects a newly received packet when it is determined that the sequence number of the newly received packet is less than the last sequence number stored for a matching packet flow (same source identifier, destination identifier and sender identifier) and falls outside of the counter-based window with respect to the last sequence number stored for the matching packet flow.

24 Claims, 7 Drawing Sheets

SENDER-SPECIFIC COUNTER-BASED ANTI-REPLAY FOR MULTICAST TRAFFIC

TECHNICAL FIELD

The present disclosure relates to anti-replay protection with respect to packet flows in a data network.

BACKGROUND

Anti-replay protection is used in data networks to prevent "attacks" that may result from so-called replay of packets to a network device. For example, time-based anti-replay protection involves examining a timestamp of a packet and discarding the packet when the timestamp of the packet is older than a predetermined period of time. Time-based anti-replay protection techniques are not adequate for certain applications that are sensitive to replayed packets such as multicast routing updates, because the packets can still be replayed within a finite time window. Voice and video applications are particularly sensitive to the sequencing of the packets and need strong replay protection.

DESCRIPTION OF EXAMPLE EMBODIMENTS

Overview

Techniques are provided for more robust counter-based anti-replay protection with respect to packets sent between network devices. These techniques are useful in data network applications where secure (encrypted) communication of packets is achieved between network devices, often called gateways, on behalf of a source device and a destination device. To this end, a network device configured for secure communications with another network device receives packets that are sent over a network. Each packet contains a source identifier that identifies a device that is the source of the packet, a destination identifier that identifies a device that is the intended destination of the packet, a sender identifier that identifies a network device that encrypted and sent the packet and a sequence number associated with the packet. The network device stores data indicating source identifier, destination identifier, sender identifier and sequence number for packets received over time. A packet flow is defined as a combination of source identifier, destination identifier and sender identifier.

For a newly received packet, the network device determines the source identifier, destination identifier and sender identifier of the newly received packet to determine whether there is stored data for a matching packet flow having a combination of source identifier, destination identifier and sender identifier which matches that of the newly received packet. The network device compares a sequence number of the newly received packet with the last sequence number stored for a matching packet flow. The network device rejects the newly received packet when it is determined that the sequence number of the newly received packet is less than the last sequence number stored for the matching packet flow and falls outside of the counter-based window with respect to the last sequence number stored for the matching packet flow. In one form, before the sender-specific counter-based anti-replay check is made, a time-based anti-replay analysis is performed in order to reject any packets that have stale timestamps.

Example Embodiments

Figure 1:
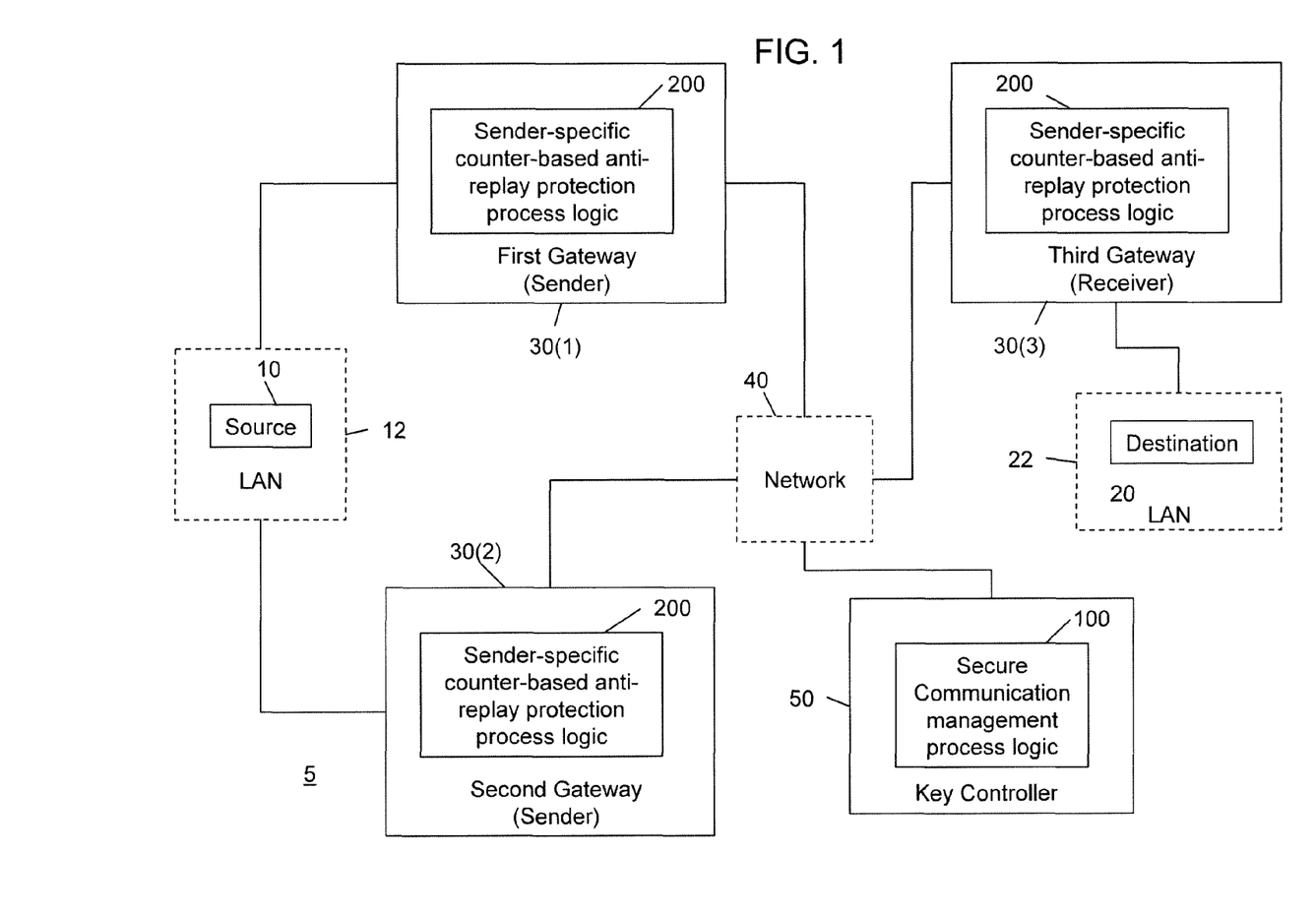
FIG. 1 is an example of a block diagram of a data network in which network devices capable of sending and receiving packet flows are configured for sender-specific counter-based anti-replay protection.

Reference is made first to FIG. 1. FIG. 1 shows a data network environment 5 comprising a plurality of network devices, called gateways, that serve to send and receive secure packet flows on behalf of a source device and a destination device. Specifically, in the example of FIG. 1, there is a source device 10 that is part of a local area network (LAN) 12. The source device 10 has data to send in a secure manner to a destination device shown at 20 that is part of a LAN 22. There are gateway network devices associated with the LAN 12 and the LAN 22 to facilitate secure (encrypted) communications of data from the source device 10 to the destination device 20. The source and destination devices 10 and 20 may be computer devices connected to respective LANs in a home or enterprise network.

FIG. 1 shows an example where there are three gateways comprising a first gateway 30(1), a second gateway 30(2) and a third gateway 30(3). This is only by way of example for purposes of described the techniques herein. It should be understood that there may be numerous other gateways in the network environment 5. Each of the gateways 30(1), 30(2) and 30(3) connects to a network 40, e.g., the Internet, and is configured to send and receive secure packet flows to each other on behalf of a source and a destination, e.g., source device 10 and destination device 20. That is, each gateway can send packets on behalf of a source device and receive packets on behalf of a destination device. Moreover, each gateway is capable of handling packet flows simultaneously for multiple secure sessions.

In order to set up and establish parameters for secure communication between gateways, a key controller 50 is provided. The key controller 50 is also connected to the network 40 in order to communicate with the gateways 30(1), 30(2) and 30(3). As explained further hereinafter, the key controller 50 sends control messages containing encryption keys and other configuration information to enable gateways to securely send and receive packets across the network 40. The key controller 50 also configures the gateways 30(1), 30(2) and 30(3) as to the type of anti-replay protection to be employed for a packet flow, as explained further hereinafter. To this end, the key controller 50 is configured with secure communication management process logic 100 that enables the controller to configure the gateways 30(1), 30(2) and 30(3) as described hereinafter in connection with FIG. 4.

Each gateway is configured with sender-specific counter-based anti-replay protection process logic 200. The process logic 200 enables a gateway to send and receive packets in a particular manner as described herein for sender-specific of sender identification-based counter-based anti-replay protection. The process logic 200 also configures a gateway to be responsive to control messages received from the key controller 50 in order to configure the anti-replay protection analysis performed on a packet flow. The process logic 200 is described hereinafter in connection with FIGS. 5-9.

When a device, such as source device 10, has data to send securely to a destination, e.g., destination device 20, a secure session, such as an Internet Protocol (IP) Security (IPsec) Security Association (SA) session, is established between a sender gateway on behalf of the source device and a receiver gateway on behalf of the destination device. The gateways register with the key controller 50, receive keys for the SA session and receive other configuration information for the SA session.

In many applications for secure communication of packets, packets from a source device, e.g., source device 10, that are sent to a destination device, e.g., destination device 120, are load-balanced among two or more gateways, e.g., gateway 30(1) and gateway 30(2) for ultimate delivery to the destination device. The possibility of a single source of packets being securely sent by more than one gateway results in sequence counters for the packets not being unique for the packets. Therefore, a single Security Parameter Index (SPI) table that stores data for the source identifier, the destination identifier and the next sequence number is not reliable for anti-replay protection. Packets may be discarded because they are mistakenly construed as replayed packets when in fact they are legitimate packets from the source, but sent from a different sender gateway.

For example, when a first packet is sent on a first link via a first gateway 30(1), the packet would be sent with sequence number 1 and the next sequence number would be 2. But the next packet is load-balanced and sent via the second gateway 30(2), which would send the packet with sequence number 1. The receiving gateway would discard or drop the packet from the second gateway 30(2) because it would interpret that received packet (which is the packet with sequence number 2) has having already received the packet because it was given sequence number 1 when it was sent from the second gateway 30(2), and it already received a packet, albeit from the first gateway 30(1), with sequence number 1.

According to the techniques described herein, the uniqueness of the sequence counters for packet flows is maintained by adding a sender identifier in the packets to identify to the receiver gateway the particular sender gateway that sent the packet. In this way, packets that are part of the same source stream, but which are sent via different gateways, are separately tracked for anti-replay protection so that packets at the receiver gateway are not erroneously rejected as being replayed packets.

Figure 2:
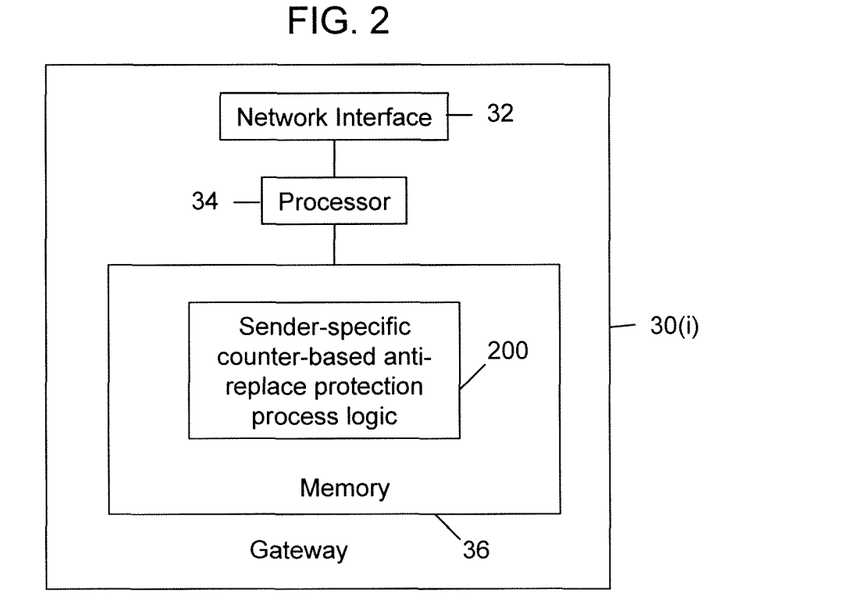
FIG. 2 is an example of a block diagram of a network device, e.g., a gateway device, that is configured to perform sender-specific counter-based anti-replay protection.

Turning to FIG. 2, an example of a block diagram is described of a gateway network device, generically identified by reference number 30(i) (as being representative of any of the gateway devices 30(1)-30(3) shown in FIG. 1). The gateway network device 30(i) is a computing device with packet routing capabilities. To this end, the gateway network device comprises a network interface (e.g., Ethernet network card or unit) 32, a processor 34 and memory 36 that stores or is encoded with instructions for the sender-specific counter-based anti-replay protection process logic 200. There may be other components in the gateway 30(i) but those components are not shown in FIG. 2 for simplicity since they do not pertain to the techniques described herein.

The processor 34 may be a programmable processor or a fixed-logic processor. In the case of a programmable processor, the memory 36 is any type of tangible processor readable memory (e.g., random access, read-only, etc.) that is encoded with or stores instructions. For example, the processor 34 is a microprocessor or microcontroller. Alternatively, the processor 34 may a fixed-logic processing device, such as an application specific integrated circuit or digital signal processor, that is configured with firmware comprised of instructions that cause the processor 34 to perform the functions described herein. Thus, the process logic 300 may take any of a variety of forms, so as to be encoded in one or more tangible media for execution, such as with fixed logic or programmable logic (e.g., software/computer instructions executed by a processor) and the processor 34 may be a programmable processor, programmable digital logic (e.g., field programmable gate array) or an application specific integrated circuit (ASIC) that comprises fixed digital logic, or a combination thereof. In general, the process logic 200 may be embodied in a processor readable medium that is encoded with instructions for execution by a processor (e.g., processor 34) that, when executed by the processor, are operable to cause the processor to perform the functions described herein in connection with process logic 200.

Figure 3:
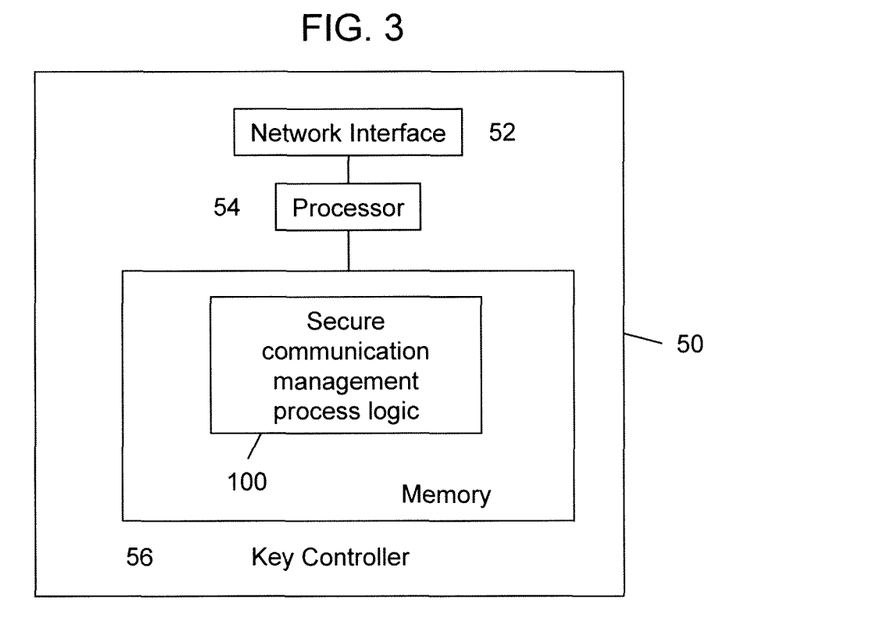
FIG. 3 is an example of a block diagram of a key controller apparatus that is configured to manage packet flows between network devices for sender-specific counter-based anti-replay protection.

FIG. 3 illustrates an example of a block diagram for key controller 50. The key controller 50 is a computing device, e.g., a server computer, that has network communications capabilities to enable it to communicate with gateways. To this end, the key controller 50 comprises a network interface 52 (similar to the network interface 32 of the gateway shown in FIG. 2), a processor 54 and memory 56 that stores or is encoded with instructions for secure communication management process logic 100. There may be other components in the key controller 50 but those components are not shown in FIG. 3 for simplicity since they do not pertain to the techniques described herein. The processor 54 and memory 56 may take on the forms described above in connection with the description of like components of the gateway shown in FIG. 2.

Figure 4:
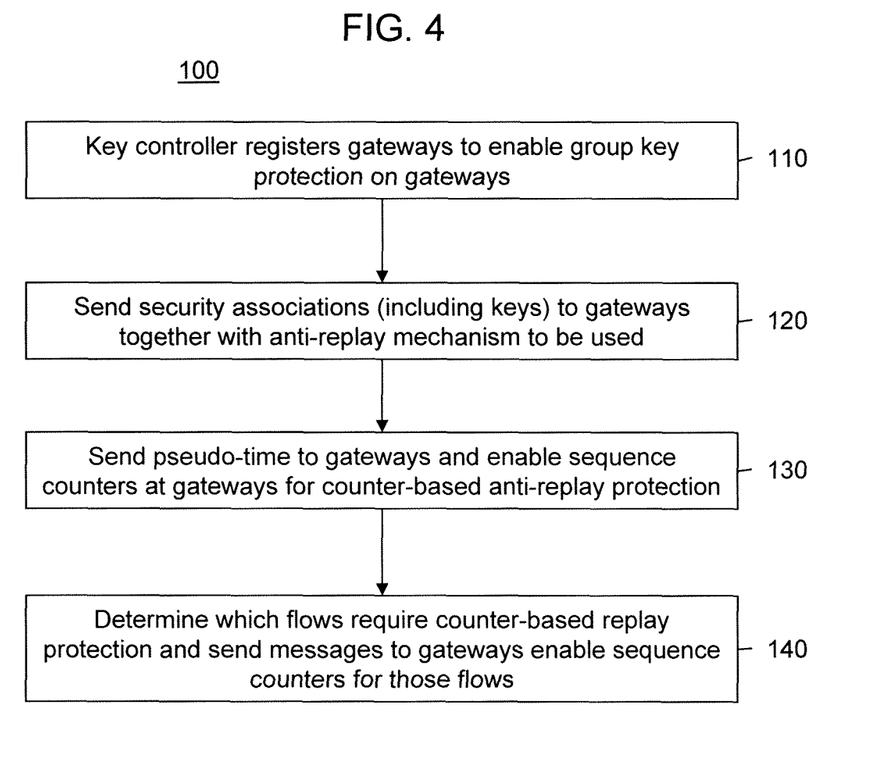
FIG. 4 is an example of a flow chart for the flow management control process performed by the key controller.

Turning now to FIG. 4, the secure communication management process logic 100 is now described. The key controller 50 executes the process logic 100 to manage and configure secure communication between gateways on behalf of source and destination devices. At 110, the key controller 50 registers gateways in order to set up and configure secure (encrypted) communication of packets between gateways. Upon initiation of a transmission to be sent from a source device to a destination device, gateways associated with the source and destination devices send messages to the key controller 50 to register with the key controller 50. At 120, the key controller 50 sends parameters for SAs (including encryption keys) which the gateways use to encrypt and decrypt the traffic. In addition, the key controller 50 sends configuration information indicating the anti-replay mechanism to be used by the gateways. At 130, the key controller sends pseudo-time information to the gateways and enables the sequence counters for packet flows for an SA to enable counter-based anti-replay protection. The pseudo-time information is a clock maintained by key controller 50 and is used for time based anti-replay; it is not synchronized to the real-world clock. At 140, the key controller 50 determines which packet flows require tighter anti-replay protection of the sender-specific counter-based anti-replay protection techniques described herein. Not all flows may be subject to the sender-specific counter-based anti-replay protection, which enables scalability across multiple gateways. The key controller 50 sends a control message to the gateways that causes the gateways to enable or configure the sequence counters for the packet flows that the key controller 50 designates.

Figure 5:
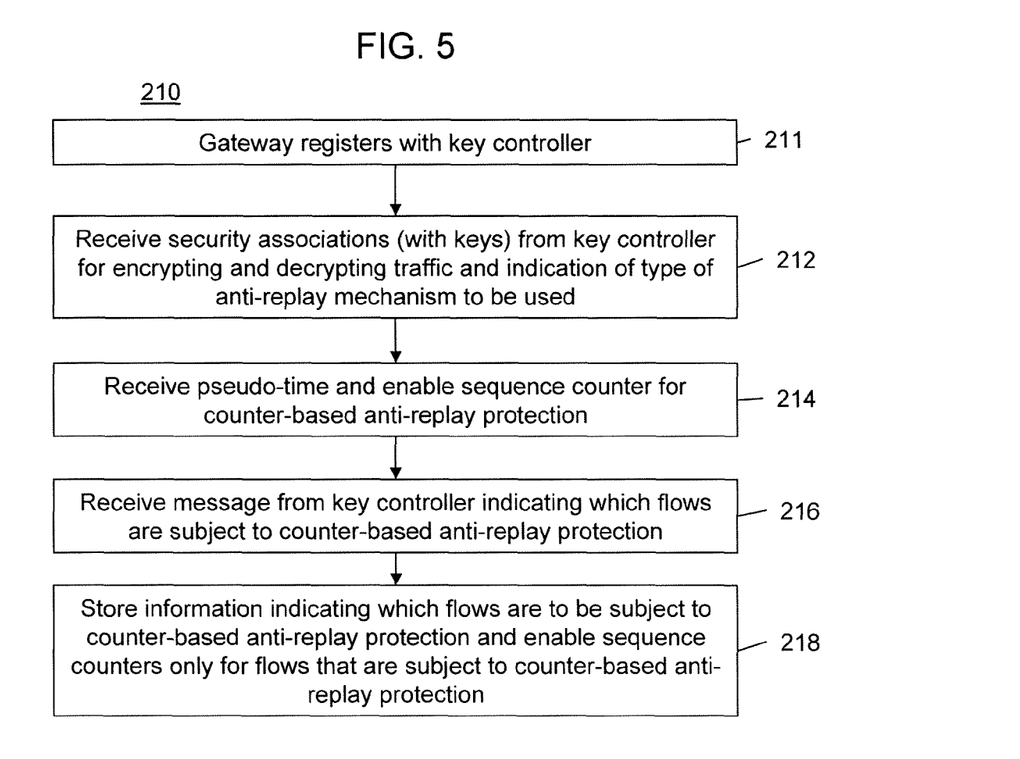
FIG. 5 is an example of a flow chart for a process in which a network device receives configuration messages from the key controller to configure the anti-replay protection measures the network device performs for packet flows.
Figure 6:
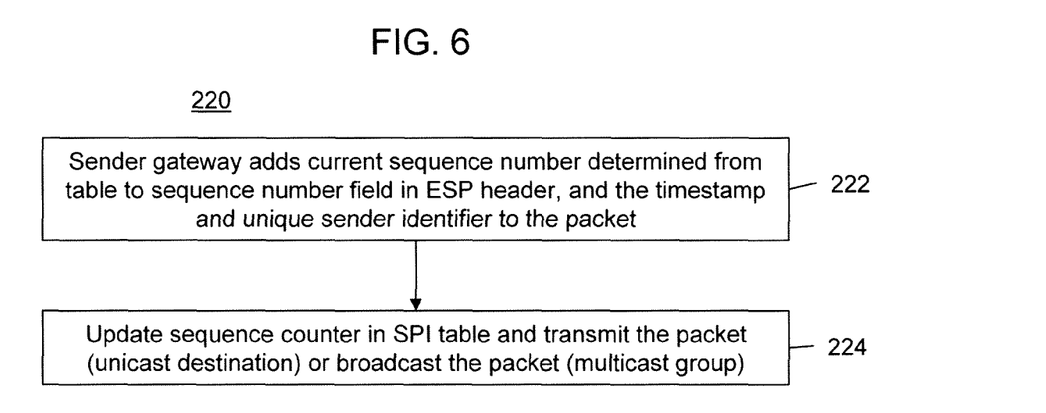
FIG. 6 is an example of a flow chart for a process in which a sending network device includes sender identification information in a packet that it transmits as part of a packet flow to a destination device.
Figure 8:
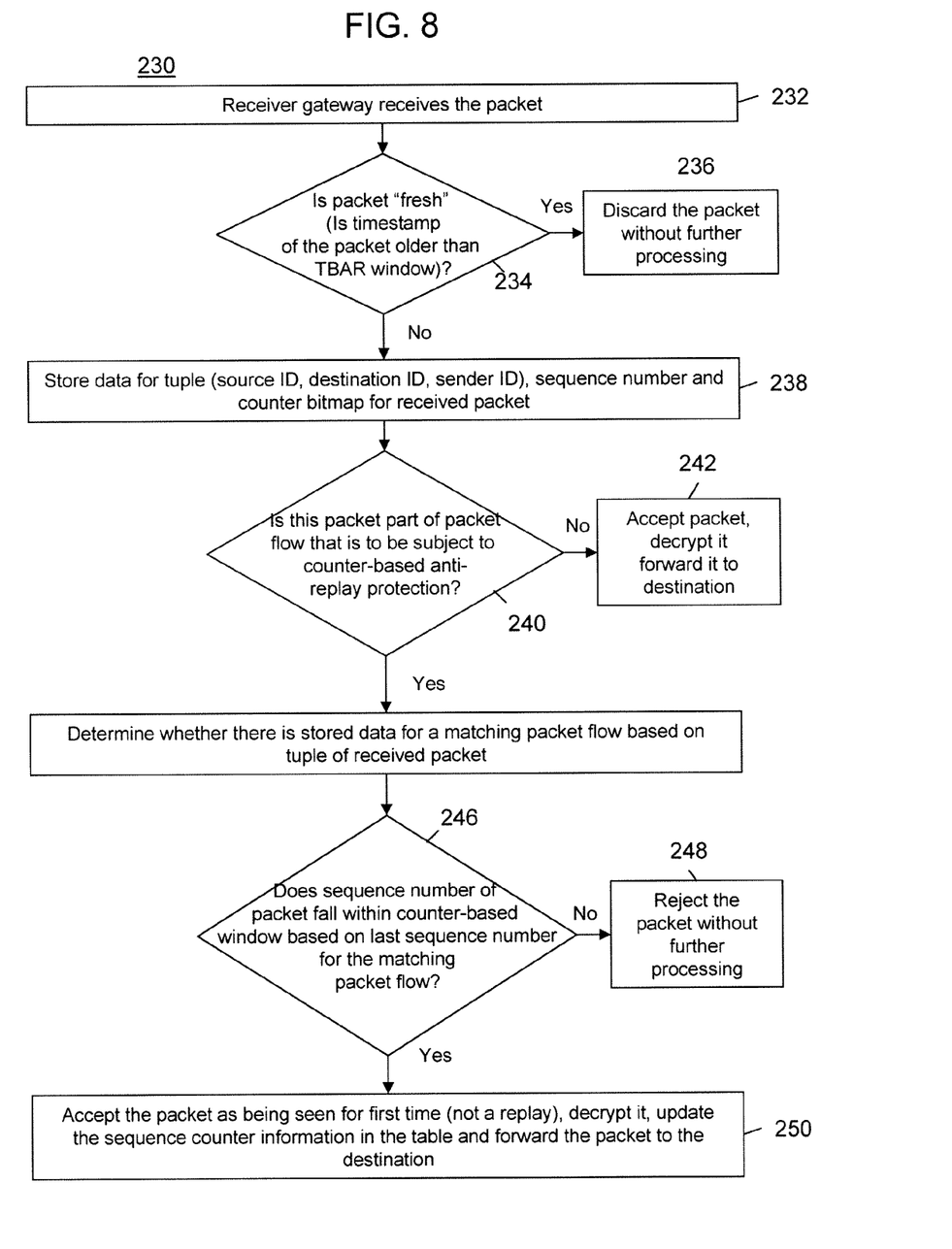
FIG. 8 is an example of a flow chart for a sender-specific anti-replay protection process performed in a network device with respect to packets received from a sending network device.

There are several processes associated with the sender-specific counter-based anti-replay protection process logic 200. FIG. 5 illustrates a flow chart for a first of these processes, which involve responding to control messages from the key controller 50 to configure how it handles packet flows for anti-replay protection. FIG. 6 illustrates a flow chart for a second of these processes, which is directed to how a gateway sends packets as part of a packet flow to be subjected to the sender-specific counter-based anti-replay protection techniques described herein. FIG. 8 illustrates a flow chart for a third of these processes, and depicts a process by which a gateway performs the sender-specific counter-based anti-replay protection with respect to received packets from sender gateways.

Reference is now made to FIG. 5 that illustrates a flow chart for a configuration process 210 performed at the gateway in response to control messages received from the key controller 50. At 211, the gateway registers with the key controller 50 by sending appropriate messages and authenticity information to the key controller 50. Upon its authentication, the key controller 50 sends various control messages back to the gateway as described above in connection with FIG. 4. Thus, at 212, the gateway receives SAs (with keys) from the key controller 50 and an indication of the type of anti-replay mechanism to be used (time-based, counter-based, etc.). At 214, the gateway receives the pseudo-time information and enables the sequence counter for counter-based anti-replay protection.

At 216, the gateway receives a control message from the key controller 50 to indicate which packet flows are to be subject sender-specific counter-based anti-replay protection. As explained above in connection with FIG. 4, the key controller 50 decides which packet flows are to be subjected to the tighter counter-based anti-replay protection techniques described herein. Since the counter-based anti-replay techniques described herein require more state information to be maintained for each SA, this increases memory. Thus, to ensure scalability of these techniques, the key controller 50 can select the packet flows that require the tighter anti-replay protection pursuant to the functions depicted at 140 in FIGS. 4 and 214 in FIG. 5. At 218, the gateway stores information indicating which packet flows are to be subjected to counter-based anti-replay protection and enables the sequence counters only for those flows.

Reference is now made to FIG. 6 for a description of the process 220 by which a sender gateway includes information in packets that are sent as part of a SA to a receiver gateway. At 222, the sender gateway includes in the sequence number field in the ESP header the current sequence number for the packet determined from a stored SPI table. The sender gateway also adds the timestamp for the packet and a unique sender identifier to a field in the packet. The sender identifier is an identifier that is unique to each gateway and uniquely identifies the gateway that sends a packet.

Figure 7:
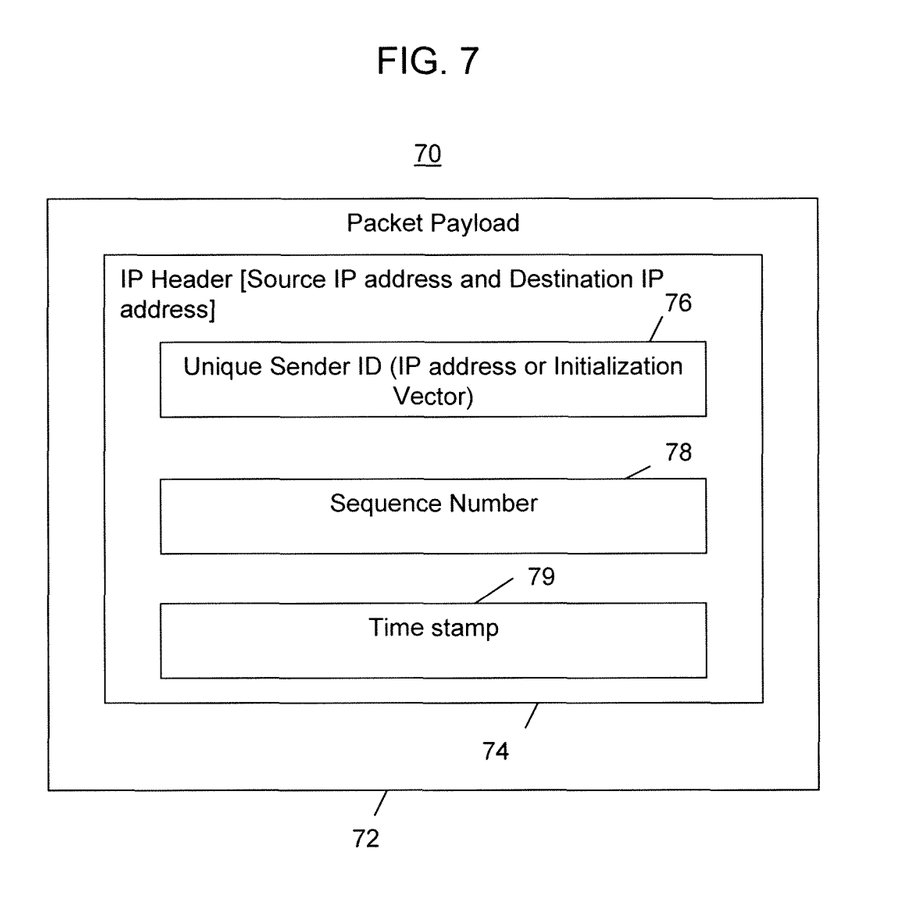
FIG. 7 is diagram depicting an example of how a network device includes the sender identification, sequence number and timestamp in a packet.

Turning to FIG. 7, an example of a packet that is created for secure transmission to a receiver gateway is shown. The packet is shown generally at reference numeral 70. This diagram is not meant to reflect the specific structure of the packet, but rather indicates the different data that is used to track a packet according to the sender-specific counter-based anti-replay techniques described herein. The packet 70 comprises a payload area 72 and within the payload area 72 there is a header field 74, such as an IP header associated with the packet. The IP header contains an identifier of the source device for the packet, e.g., a source IP address corresponding to the IP address of the source device, and an identifier for the intended destination of the packet, e.g., a destination IP address corresponding to the IP address of the destination device. In addition, the header 74 comprises a unique sender identifier (ID) 76, a sequence number 78 and a timestamp 78.

There are several ways to include the sender ID 76 in a packet. One technique is to use the IP address of the gateway that performs the encryption and sends the packet. In this case, an additional field in the header 74 may be created to send the unique sender ID. For example, the time-based anti-replay metadata header that is used for sending the timestamp 79 may be used to incorporate the sender IP address. Another technique that is useful with new encryption standards such as Galois Counter Mode-Authentication Encryption (GCM-AES) and Galoi Message Authentication Code (GMAC), involves using an Initialization Vector (IV) used in the ESP payload field data. The IV is formed by concatenating a Sender Identification (SID) field with Sender Specific IV (SSIV) and the SID is unique to each sender gateway of gateways serving the SA. Thus, the sender ID is embodied as an IV (comprised of a SID concatenated with a SSIV) for GCM and GMAC encryption standards instead of the IP address of the sender gateway. The sender ID may also referred to a group member ID, where the "group" is a group of gateways that are authorized by the key controller 50.

Referring back to FIG. 6, at 224, the sender gateway updates the sequence counter in the SPI table it maintains and transmits the packet to a unicast destination or broadcasts the packet to a multicast group address. Thus, as indicated at 224, the sender gateway maintains a SPI table for the packets that it sends to a receiver gateway. An example of data maintained in an SPI table at the sender gateway is shown Table 1 below.

TABLE 1

Example of SPI Table Maintained for Outgoing Packets at Gateway.

| # | Source IP Address | Destination IP Address | Last sequence number and Counter Bitmap |
|---|---|---|---|
| 1 | 10.0.0.1 | 172.168.1.1 | 18 01101010001 . . . 0001 |
| 2 | 10.0.1.1 | 172.168.2.1 | 22 01110000010 . . . 1110 |
| 3 | 10.0.2.2 | 172.168.3.2 | 88 11110001010 . . . 1010 |

In Table 1 above, for each packet that the gateway sends, the gateway maintains an indication of the source IP address of the packet, destination IP address of the packet, last sequence number used for a packet in that packet flow and a counter bitmap that indicates the counter to be used for counter-based anti-replay protection at the receiver device with respect to that packet for that packet flow. For example, for packet flow "1", the source IP address is "10.0.0.1", the destination IP address is "172.168.1.1", the last sequence number for this packet flow is "18" and the counter bitmap is "01101010001 . . . 0001". Likewise, for packet flow "2", the source IP address is "10.0.0.2", the destination IP address is "172.168.2.1", the last sequence number for this packet flow is "22" and the counter bitmap is "01110000010 . . . 1110".

Reference is now made to FIG. 8 for a description of process 230 by which a gateway performs sender-specific counter-based anti-replay protection with respect to received packets from sender gateways. At 232, the gateway receives packets sent over a network from another gateway, a sender gateway. As described above in connection with FIG. 7, each packet contains a source identifier (ID that identifies the source device that is the original source of the packet, a destination ID that identifies the intended destination device of the packet, a sender ID that identifies the gateway network device that encrypted and sent the packet and a sequence number associated with the packet. A tuple is defined as a combination of source ID, destination ID and sender ID and each packet contains this tuple. Each gateway that receives a packet also stores this tuple, as explained above in connection with Table 2.

At 234, the gateway performs time-based anti-replay (TBAR) analysis on a newly received packet. That is, the gateway determines whether the packet is "fresh" by examining the timestamp of the packet with respect to a TBAR window. When the gateway determines that the timestamp of the packet indicates that it is outside of the TBAR window (older than a predetermined time period), the gateway discards the packet at 236 without any further processing. Thus, the TBAR analysis at 234 filters out any packets which are stale and should not be considered for further anti-replay analysis. If the newly received packet is determined to be fresh, then the process continues to 238. Said another way, the sender-specific counter-based anti-replay protection functions 240-250 are performed within the TBAR window.

At 238, the gateway obtains from the newly received packet the tuple comprising the source ID, destination ID and sender ID of the packet, and the sequence number and counter bitmap of the packet. When the sender ID is an IP address, the receiver gateway obtains it from a header of the packet, such as from the timestamp portion of the time-based anti-replay metadata header of the packet, as explained above in connection with FIG. 7. When the sender ID is an IV (comprised of a SID concatenated with a SSIV), then the sender ID is obtained from the ESP payload field of the received packet, as explained above in connection with FIG. 7. The gateway maintains a SPI table like the one shown in Table 2 below for received packets. Table T2 is described hereinafter.

At 240, the gateway determines whether this packet is part of a packet flow that is subject to the counter-based anti-replay protection techniques described herein. If the packet is part of a flow that is not subject to the counter-based anti-replay protection techniques, then at 242, it is accepted, decrypted and forwarded to its destination. When it is determined, based on stored information derived from a control message received from the key controller 50, that the packet is part of a packet flow that is to be subject to the counter-based anti-replay protection techniques, then the process continues to 244.

At 244, the gateway determines whether the aforementioned tuple of source ID, destination ID and sender ID of the newly received packet matches a tuple in the stored data for a packet flow. In other words, the gateway determines whether there is stored data for a matching packet flow based on the combination of source ID, destination ID and sender ID of the received packet. Table 2 below provides examples of the data stored for received packets, and as explained above, includes the unique sender ID of the packet (second column from the right), which identifies the gateway that encrypted and sent the packet. The stored data also includes the last sequence number for packet received for that packet flow, together with the counter bitmap representing the counter-based window to be used for counter-based anti-replay analysis for subsequently received packets for that packet flow. A packet flow is defined, in terms of the data stored at the receiver gateway, based on packets received from a sender gateway, by a combination of source ID, destination ID and sender ID.

When, at 244, it is determined that there is no stored data for a matching packet flow (no packets having the same tuple as the received packet), then the data for that packet is stored and it will be the first packet received for that packet flow. On the other hand, when there is a matching packet flow for the newly received packet, then at 246 a comparison is made.

Specifically, at 246, the sequence number of the newly received packet is compared with the last sequence number stored for the matching packet flow to determine whether the sequence number of the newly received packet is after the last sequence number of falls within a counter-based window with respect to the last sequence number stored for the matching packet flow. Again, the counter-based window is determined by the counter bitmap stored for the last received packet for that packet flow. The counter bitmap defines the size of the window, i.e., range of sequence numbers, against which any packets with a sequence number less than the last sequence is compared in order to determine whether the newly received packet is deemed a replay and thus rejected or discarded. Unlike prior anti-replay techniques, the comparison at 246 is made specific to the packet flow from a particular sender gateway because data (and sequence counters) for packet flows sent by different sender gateways (but from the same source to the same destination) are separately stored and maintained. If there are other packet flows from the same source to the same destination, sent by a different sender gateway, the newly received packet will not be compared with a sequence counter for those other packet flows; it will be compared against the latest counter only for the matching packet flow (same source ID, same destination ID and same sender ID). The possibility of a "false" replay detection is therefore greatly reduced.

As explained above, the counter-based window is defined by the counter bitmap data contained in the packet for the last received packet (last sequence number) for that packet fellow.

TABLE 2

SPI Table for Received Packets Maintained by Gateway.

| Entry | Source IP Address | Destination IP Address | Unique Sender ID | Last sequence number and counter Bitmap |
|---|---|---|---|---|
| 1 | 10.0.0.1 | 172.168.1.1 | 1.1.1.1 | 18 01101010001 . . . 0001 |
| 2 | 10.0.0.1 | 172.168.1.1 | 1.1.2.1 | 16 01110010101 . . . 1100 |
| 3 | 10.0.1.1 | 172.168.2.1 | 1.1.1.1 | 22 01110000010 . . . 1110 |
| 4 | 10.0.1.1 | 172.168.2.1 | 1.1.2.1 | 10 01010010100 . . . 0110 |
| 5 | 10.0.2.2 | 172.168.3.2 | x.x.x.x | 88 11110001010 . . . 1010 |

At 248, when the sequence number of the newly received packet is determined to be less than the last sequence number stored for the matching packet flow and outside the counter-based window for that (sender gateway-specific) packet flow, then the packet is deemed a replay and is rejected (and dropped or discarded) without further processing.

When, on the other hand, the sequence number of the newly received packet is determined to fall within the counter-based window or is after the last sequence number for the matching packet flow, then at 250, the packet is accepted as being seen for the first time (not a replay). The packet is decrypted, the SPI table is updated (the sequence counter is updated for that packet flow based on the counter bitmap for that packet) and the packet is forwarded to the destination according to the destination ID in the packet.

Referring to Table 2 above, there are entries for packets from the same source to the same destination, but which are encrypted and sent by different gateways. These packet flows are separately tracked, and in particular, the counter-based window for counter-based anti-replay analysis is separately maintained for each flow. For example, entries 1 and 2 in Table 2 comprises data for packets sent from the same source to the same destination, but encrypted and sent from different gateways (the sender ID for entry 1 is "1.1.1.1" and the sender ID for entry 2 is "1.1.2.1"). Even though these packet flows are from the same source to the same destination, they are tracked separately for purposes of counter-based anti-replay analysis because they are sent by a different gateway. For example, the last sequence number for the packet flow sent by gateway "1.1.1.1" is "18" and the counter-based window is "01101010001 . . . 0001" whereas the last sequence number for the packet flow sent by gateway "1.1.2.1" is "16" and the counter-based window is "01110010101 . . . 1100". Newly received packets are compared against the last sequence number using the appropriate counter-based window data specific to the data stored for packets from the same source to the same destination and sent by the same sender gateway. A similar example applies to the packets for entries 3 and 4 in Table 2.

The entry 5 in Table 2 has in the Unique Sender ID column the expression "x.x.x.x." which is an indication of a "don't care" condition. The receiver gateway stores an indication of this "don't care" condition when it has received a control message from the key controller 50 indicating that it does not need to perform the (sender-specific) anti-replay protection process described herein. This follows from the description above in connection with 140 in FIGS. 4 and 218 in FIG. 5, and results in the path from 240 to 242 described above in connection with FIG. 8.

Figure 9:
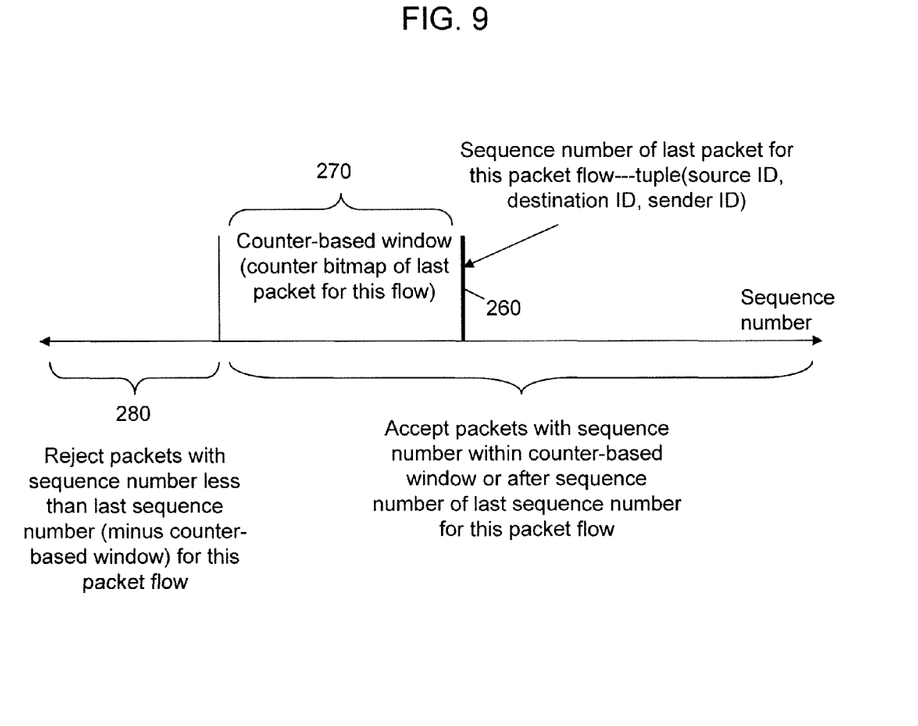
FIG. 9 is a diagram depicting an example of the operation of the sender identification-based anti-replay protection process.

FIG. 9 illustrates the underlying logic of the process functions 246, 248 and 250 described above in connection with FIG. 8. The counter-based window is maintained for each packet flow for packets having a common tuple of source ID, destination ID and sender ID. The horizontal line is meant to represent an increasing progression, from left to right, of sequence numbers. The sequence number for the last packet received for a packet flow is shown at 260. The counter-based window for the packet flow is shown at 270 and as explained above, is based on the counter bitmap of the last packet for this packet flow. When a newly received packet has a tuple that matches this packet flow, the sequence number of the newly received packet is compared against the sequence number for the last packet received for this packet flow, which is shown at 270. When the sequence number of the newly received packet is less than the last sequence number shown at 270 by an amount greater than the counter-based window 270, the newly received packet is rejected as shown at 280. On the other hand, when the sequence number of the newly received packet is within the counter-based window 270 or greater than the last sequence number 260 for this packet flow, then the packet is accepted as shown at 290.

The sender-specific counter-based anti-replay techniques described herein are useful in network environments where multiple gateways may be used to encrypt and send packets of a source stream from a source device to a destination device. In addition, these techniques are useful for stronger or tighter anti-replay protection in networking environments for all types of traffic (e.g., data, voice, and video), such as group encrypted transport virtual private networking (VPN). Group encrypted transport VPN eliminates the need for compromise between network intelligence and data privacy in private wide area network environments by simplifying VPN provisioning and management. By incorporating counter-based anti-replay analysis within a time-based anti-replay scheme, a highly scalable anti-replay solution is provided. Moreover, the techniques described herein allow for controlling or configuring which flows are subject to counter-based anti-replay protection.

The above description is by way of example only.

What is claimed is:

1. A method comprising:
    at a network device configured for secure communications with another network device, receiving packets of a packet flow sent over a network from a plurality of sending network devices, each packet containing a source identifier that identifies a device that is the source of the packet, a destination identifier that identifies a device that is the intended destination of the packet, a sender identifier that identifies which of the plurality of network devices that encrypted and sent the packet and a sequence number associated with the packet;
    at the network device, storing data indicating source identifier, destination identifier, sender identifier and sequence number for packets received over time, and wherein the packet flow is represented by a combination of source identifier, destination identifier and sender identifier;
    for a newly received packet, determining the source identifier, destination identifier and sender identifier of the newly received packet to determine whether there is stored data for a matching packet flow having a combination of source identifier, destination identifier and sender identifier which matches that of the newly received packet;
    comparing a sequence number of the newly received packet with the last sequence number stored for a matching packet flow; and
    rejecting the newly received packet when it is determined that the sequence number of the newly received packet is less than the last sequence number stored for the matching packet flow and falls outside of a counter-based window with respect to the last sequence number stored for the matching packet flow.

2. The method of claim 1, wherein storing comprises storing for each received packet counter data contained in the packet, wherein the counter data defines the counter-based window with respect to which the comparison is made for a newly received packet.

3. The method of claim 1, wherein when it is determined that the sequence number of the newly received packet is after the last sequence stored for the matching packet flow or is within the counter-based window, further comprising accepting and decrypting the newly received packet at the network device and forwarding it to its destination according to the destination identifier of the packet.

4. The method of claim 1, and further comprising obtaining the sender identifier of received packets from a time-based anti-replay metadata header of the packet, and wherein the sender identifier is an Internet Protocol (IP) address of an other network device that encrypted and sent the packet.

5. The method of claim 1, and further comprising obtaining the sender identifier in an encapsulating security payload field of received packets, and wherein the sender identifier is an initialization vector that is comprised of a sender identifier concatenated with a sender specific initialization vector.

6. The method of claim 1, and further comprising receiving a control message from a key controller, wherein the control message indicates which packet flows sent between network devices are to be subject to counter-based anti-replay protection, and wherein comparing and performing are performed for packets that are part of a packet flow that is determined to be subject to counter-based anti-replay analysis based on the control message.

7. The method of claim 1, and further comprising, at a network device configured to encrypt and send packets, including within a packet to be sent a source identifier that identifies the device that is the source of the packet, a destination identifier that identifies the device that is the intended destination of the packet, a sender identifier that identifies the network device that encrypts and sends the packet and a sequence number associated with the packet.

8. The method of claim 7, wherein including the sender identifier within the packet comprises including within a metadata header of the packet an Internet Protocol (IP) address of the network device that encrypts and sends the packet.

9. The method of claim 8, wherein including the sender identifier within the packet comprises including an initialization vector that is comprised of a sender identifier concatenated with a sender specific initialization vector.

10. The method of claim 1, wherein prior to determining, comparing and rejecting, further comprising obtaining a timestamp of the newly received packet, comparing the timestamp with respect to a time-based anti-replay window, and rejecting the newly received packet when the timestamp is outside the time-based anti-replay window and not performing determining and comparing the sequence number of the newly received packet with the last sequence number stored for a matching packet flow when the timestamp for the newly received packet is outside the time-based anti-replay window.

11. A network apparatus comprising:
a network interface unit configured to receive packets of a packet flow over a network from a plurality of sending network devices, each packet containing a source identifier that identifies a device that is the source of the packet, a destination identifier that identifies a device that is the intended destination of the packet, a sender identifier that identifies which of the plurality of sending network devices that encrypted and sent the packet and a sequence number associated with the packet;
a processor configured to be coupled to the network interface unit, wherein the processor is configured to:
store data indicating source identifier, destination identifier, sender identifier and sequence number for packets received over time, and wherein the packet flow is represented by a combination of source identifier, destination identifier and sender identifier;
for a newly received packet, determine the source identifier, destination identifier and sender identifier of the newly received packet to determine whether there is stored data for a matching packet flow having a combination of source identifier, destination identifier and sender identifier which match that of the newly received packet;
compare a sequence number of the newly received packet with the last sequence number stored for the matching packet flow; and
reject the newly received packet when it is determined that the sequence number of the newly received packet is less than the last sequence number stored for the matching packet flow and falls outside of a counter-based window with respect to the last sequence number stored for the matching packet flow.

12. The apparatus of claim 11, wherein the processor is configured to obtain the sender identifier of a received packet from a time-based anti-replay metadata header of the packet, and wherein the sender identifier is an Internet Protocol (IP) address of an other network apparatus that encrypted and sent the packet.

13. The apparatus of claim 11, wherein the processor is configured to obtain the sender identifier in an encapsulating security payload field of the received packets, and wherein the sender identifier is an initialization vector that is comprised of a sender identifier concatenated with a sender specific initialization vector.

14. The apparatus of claim 11, wherein the processor is configured to be responsive to a control message received from a key controller, which control message specifies which packet flows are to be subject to counter-based anti-replay protection, and wherein the processor executes the determine and compare functions only for packets that are part of a packet flow that is determined to be subject to counter-based anti-replay protection based on the control message.

15. The apparatus of claim 11, wherein when the processor determines that the sequence number of the newly received packet is after the last sequence stored for the matching packet flow or is within the counter-based window, the processor is further configured to accept and decrypt the newly received packet at the network device and to forward, via the network interface unit, the packet to its destination according to the destination identifier of the packet.

16. The apparatus of claim 11, wherein the processor is further configured to encrypt and send packets, and to include within a packet to be sent a source identifier that identifies the device that is the source of the packet, a destination identifier that identifies the device that is the intended destination of the packet, a sender identifier that identifies the network apparatus that encrypts and sends the packet and a sequence number associated with the packet.

17. A non-transitory processor readable medium encoded with instructions that, when executed by a processor, cause the processor to:
store data indicating source identifier, destination identifier, sender identifier and sequence number for packets of a packet flow received at a network device from a plurality of sending network devices over time, and wherein a packet flow is represented by a combination of source identifier, destination identifier and sender identifier, wherein the sender identifier identifies which of the plurality of sending network devices encrypted and sent the packet;
for a newly received packet, determine the source identifier, destination identifier and sender identifier of the newly received packet to determine whether there is stored data for a matching packet flow having a combination of source identifier, destination identifier and sender identifier which match that of the newly received packet;
compare a sequence number of the newly received packet with the last sequence number stored for a matching packet flow; and
discard the newly received packet when it is determined that the sequence number of the newly received packet is less than the last sequence number stored for the matching packet flow and falls outside of a counter-based window with respect to the last sequence number stored for the matching packet flow.

18. The processor readable medium of claim 17, and further comprising instructions that, when executed by the processor, cause the processor to, when it is determined that the sequence number of the newly received packet is after the last sequence stored for the matching packet flow or is within the counter-based window, accept and decrypt the newly received packet at the network device and to forward it to its destination according to the destination identifier of the packet.

19. The processor readable medium of claim 17, and further comprising instructions that, when executed by the processor, cause the processor to obtain the sender identifier of received packets from a time-based anti-replay metadata header of the packet, and wherein the sender identifier is an Internet Protocol (IP) address of an other network device that encrypted and sent the packet.

20. The processor readable medium of claim 17, and further comprising instructions that, when executed by the processor, cause the processor to obtain the sender identifier in an encapsulating security payload field of received packets, and wherein the sender identifier is an initialization vector that is comprised of a sender identifier concatenated with a sender specific initialization vector.

21. The processor readable medium of claim 17, and further comprising instructions that, when executed by the processor, cause the processor to be responsive to a control message received from a key controller, which control message specifies which packet flows are to be subject to counter-based anti-replay protection, and wherein the processor executes the determine and compare functions only for packets that are part of a packet flow that is determined to be subject to counter-based anti-replay protection based on the control message.

22. The method according to claim 1, further comprising:
receiving a second newly received packet, wherein a source identifier of the second newly received packet is the same as the source identifier of the newly received packet, wherein a destination identifier of the second newly received packet is the same as the destination identifier of the newly received packet, wherein a sender identifier of the second newly received packet is different than the sender identifier of the newly received packet, and wherein a sequence number of the newly second new received packet is less than the sequence number of the newly received packet; and forwarding the second newly received packet to the destination in response to determining that the sender identifier of the second newly received packet is different from the sender identifier of the newly received packet.

23. The apparatus of claim 11, wherein the processor is further configured to:
receive a second newly received packet, wherein a source identifier of the second newly received packet is the same as the source identifier of the newly received packet, wherein a destination identifier of the second newly received packet is the same as the destination identifier of the newly received packet, wherein a sender identifier of the second newly received packet is different than the sender identifier of the newly received packet, and wherein a sequence number of the newly second new received packet is less than the sequence number of the newly received packet; and forward the second newly received packet to a destination identified in the destination identifier of the second newly received packet in response to determining that the sender identifier of the second newly received packet is different from the sender identifier of the newly received packet.

24. The processor readable medium of claim 17, and further comprising instructions that, when executed by the processor, cause the processor to be responsive to:
receive a second newly received packet, wherein a source identifier of the second newly received packet is the same as the source identifier of the newly received packet, wherein a destination identifier of the second newly received packet is the same as the destination identifier of the newly received packet, wherein a sender identifier of the second newly received packet is different than the sender identifier of the newly received packet, and wherein a sequence number of the newly second new received packet is less than the sequence number of the newly received packet; and forward the second newly received packet to a destination identified in the destination identifier of the second newly received packet in response to determining that the sender identifier of the second newly received packet is different from the sender identifier of the newly received packet.

* * * * *